United States Patent
Schaffer

(10) Patent No.: US 6,286,821 B1
(45) Date of Patent: Sep. 11, 2001

(54) EXTRUDED STABILIZER BAR PIVOT BUSHING HAVING PLASTIC SHEAR PLATES AND METHOD OF MAKING SAME

(75) Inventor: David Howard Schaffer, Chelsea, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/585,377

(22) Filed: May 30, 2000

(51) Int. Cl.[7] ............................................. F16F 7/00
(52) U.S. Cl. .................................... 267/141.4; 267/141.1
(58) Field of Search ........................ 188/140.12, 140.4, 188/141.1, 141.3, 141.7, 279, 281; 403/225, 228

(56) References Cited

U.S. PATENT DOCUMENTS

| | | | |
|---|---|---|---|
| 4,157,227 | * 6/1979 | Hahle | 267/141.1 |
| 4,286,827 | 9/1981 | Peterson et al. | 308/26 |
| 4,889,328 | * 12/1989 | Uno et al. | 267/141.2 |
| 4,899,997 | * 2/1990 | Thorn | 267/141.2 |
| 5,190,269 | * 3/1993 | Ikeda et al. | 267/140.12 |
| 5,290,018 | 3/1994 | Watanabe et al. | 267/293 |
| 5,413,374 | * 5/1995 | Pierce | 403/225 |
| 5,449,152 | 9/1995 | Byrnes et al. | 267/153 |
| 5,565,251 | 10/1996 | Tang et al. | 428/36.8 |
| 5,692,767 | * 12/1997 | Kato | 267/141.2 |

* cited by examiner

*Primary Examiner*—Christopher P. Schwartz
(74) *Attorney, Agent, or Firm*—Gregory P. Brown; William J. Coughlin

(57) ABSTRACT

A method of making stabilizer bar pivot bushings (10). At least one length of a substantially plastic material (26, 28) that in transverse cross section has a shape that is arcuate about a central axis passes lengthwise through an extrusion die where an annular elastomeric body (22) is extruded onto the plastic. Then the body is transversely cut, including cutting through the plastic, at locations along the length of the extrusion, thereby creating individual bushings in which the plastic forms at least one shear plate.

14 Claims, 1 Drawing Sheet

EXTRUDED STABILIZER BAR PIVOT BUSHING HAVING PLASTIC SHEAR PLATES AND METHOD OF MAKING SAME

BACKGROUND OF THE INVENTION

1. Field of the Invention

This invention relates to a pivot for a stabilizer bar in a suspension system of an automotive vehicle and a method of making a bushing used in the pivot.

2. Background Information

A purpose of a stabilizer bar in a suspension system of an automotive vehicle is to resist rolling of the vehicle body in relation to wheels of the vehicle when the vehicle is making a maneuver such as a turn. A known device for mounting a stabilizer bar with respect to a vehicle body is an elastomeric pivot bushing. The bushing is annular in shape and captured in a metal bracket that is fastened to a part of the vehicle undercarriage that is in fixed relation to the body. Such a part may be a frame or sub-frame of the vehicle for example. A free end of the stabilizer bar is associated in a suitable manner with a portion of the vehicle that is associated with the vehicle undercarriage through a suspension system. The stabilizer bar is arranged to resist certain types of relative motion so the vehicle body will tend to remain more stable during certain driving maneuvers such as turns.

It is known to fabricate such bushings by injection molding and to include inserts in such bushings. It is believed that injection molding is relatively expensive because it requires injection molding capital equipment and a die that has one or more mold cavities. Where a bushing includes one or more inserts, they must also be loaded into the die before the elastomer is injected. The cycle time must be long enough to allow the injected elastomer to cure sufficiently before it is removed from the die.

SUMMARY OF THE INVENTION

The present invention relates to what is believed to be a less expensive, more efficient method for making a stabilizer bar bushing. The method can be practiced without injection molding in a molding die, free of factors that may complicate that type of process.

Generally speaking, the present invention relates to a method of making a stabilizer bar bushing that employs extrusion of elastomeric material rather than injection molding of such material. The invention also relates to the resulting bushing.

Because shear plates embedded in the elastomeric body of a stabilizer bar bushing impart certain characteristics that are desirable from a performance standpoint, the inventive method provides an efficient way to incorporate them during the extrusion process. One or more shear plates are run lengthwise through an extrusion die where the elastomeric material is extruded around the plate or plates in proper manner to produce the desired transverse cross sectional shape for the finished bushing. Finished bushings are severed from the extruded material by transversely cutting the extruded material into individual pieces of desired length at successive intervals.

It is believed that the method is beneficially conducive to the use of shear plates fabricated from certain plastic material. Compared to metal shear plates, the material characteristics of substantially plastic shear plates are believed more consistent with those of the elastomeric materials in which they are embedded. For example, elastomerics may bond better to plastics than to metal. Substantially plastic shear plates may be cut with less difficulty than metal ones, a desirable attribute for the inventive method when individual bushings are being severed from an extrusion.

Accordingly, a general aspect of the invention relates to a method of making pivot bushings comprising: providing at least one length of insert material having a transverse cross section that in the individual pivot bushings is arcuate about a central axis; moving the insert material lengthwise through an extrusion die; at the die, creating an annular elastomeric body within which the insert material is embedded by extruding elastomeric material in covering relation to the insert material as the insert material moves through the die; and then transversely cutting through the annular elastomeric body, including cutting through the insert material, at locations along the length of the insert material, thereby creating individual bushings.

Another general aspect of the invention relates to a bushing for mounting a stabilizer bar in association with a suspension system on the undercarriage of a motor vehicle comprising: an elastomeric body that is annular about a central axis and comprises a central through-hole adapted to receive a portion of the stabilizer bar and an outer perimeter adapted to be received in a bracket for attachment to the undercarriage; and at least one shear plate of substantially plastic material that in transverse cross section has a shape which is arcuate about the central axis and that is embedded within the elastomeric body.

Still another general aspect relates to a suspension system of a motor vehicle comprising: a stabilizer bar; a bushing for associating a portion of the stabilizer bar with an undercarriage of the vehicle; and a bracket which is attached to the vehicle undercarriage and within which the bushing is received; the bushing comprising an elastomeric body that is annular about a central axis and comprises a central through-hole within which the portion of the stabilizer bar is received and an outer perimeter which is received in the bracket, and at least one shear plate of substantially plastic material that in transverse cross section has a shape which is arcuate about the central axis and that is embedded within the elastomeric body.

Further aspects will be seen in various features of a presently preferred embodiment of the invention that will be described in detail and in principles of the invention as set forth in various claims.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENT(S)

Figure 1:
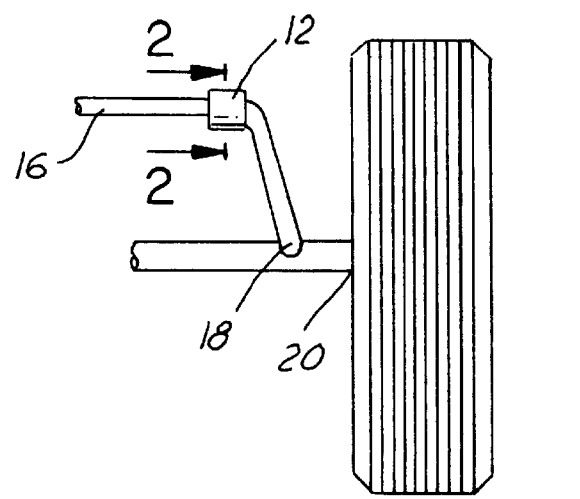
FIG. 1 is a fragmentary vertical view of a portion of an automotive vehicle, including a pivot bushing according present invention.
Figure 2:
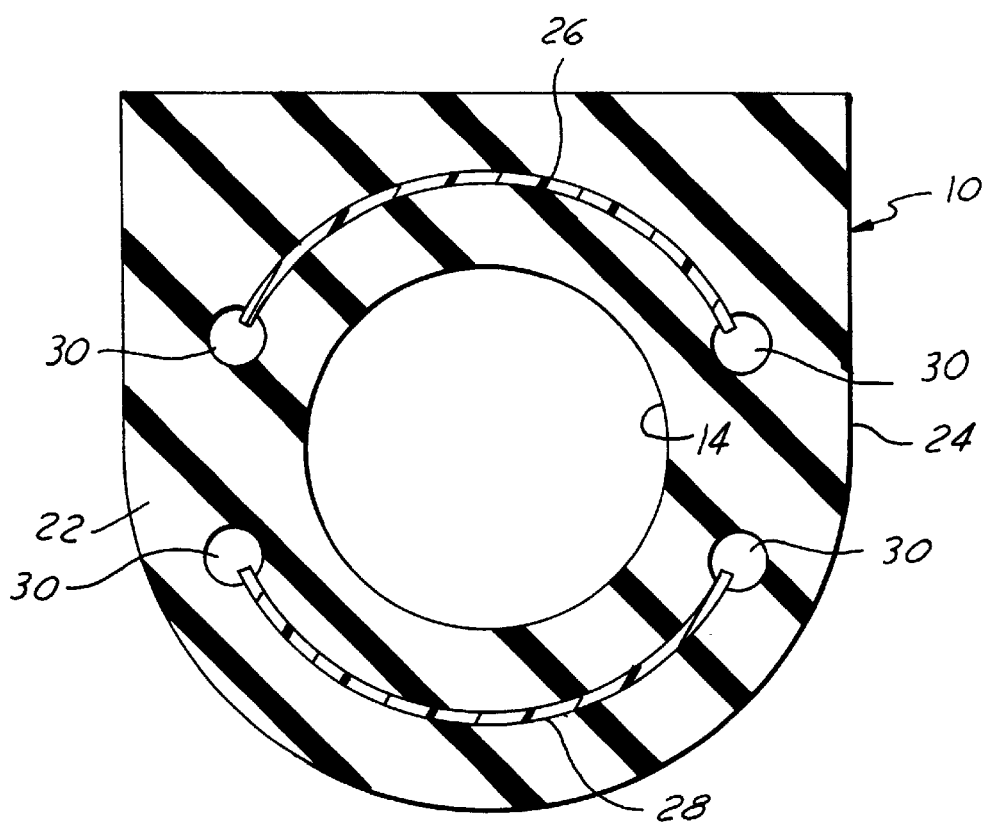
FIG. 2 is an enlarged transverse cross section view of the pivot bushing by itself, taken in the direction of arrows 2—2 in FIG. 1.

FIGS. 1–2 disclose a stabilizer bar pivot bushing 10 embodying principles of the present invention. Pivot bushing 10 is annular in shape and captured in a metal bracket 12 (see FIG. 1) that is fastened in any suitable manner to a part of the vehicle undercarriage, such as a frame or sub-frame, that is in fixed relation to the vehicle body. Bushing 10 comprises a central through-hole 14 having a shape suitable for fitting to a portion of a stabilizer bar 16. In the example shown, through-hole 14 is circular, defining an inside diameter (I.D.) of the bushing. Stabilizer bar 16 has a shape leading to a free end 18 that is associated in a suitable manner with a portion of the vehicle that is associated with the vehicle undercarriage through a suspension system, in this instance a wheel and axle 20. Stabilizer bar 16 is arranged to resist certain types of motion of the wheel and axle relative to the vehicle undercarriage and body so that the vehicle body will tend to remain more stable during certain driving maneuvers such as turns.

Pivot bushing 10 further comprises an elastomeric body 22 having an outer perimeter 24. Outer perimeter 24 has a shape suitable for acceptance by bracket 12 to mount the bushing on a vehicle frame. Embedded within elastomeric body 22 are two shear plates 26, 28. Each shear plate has an arcuate shape in transverse cross section, as shown by FIG. 2. The arcuate shapes are disposed generally diametrically opposite each other and approximately on an imaginary circle concentric with the bushing I.D. The arcuate extent of each shear plate is substantially more than 90° but substantially less than 180°. The material of each shear plate is of generally uniform thickness in the radial direction.

While bushing 10 may function in substantially the same manner as an injection molded one containing inserted metal shear plates, bushing 10 is believed inventive for several reasons. Those reasons include the method by which the bushing is fabricated and its constructional features.

One of the steps in fabricating elastomeric body 22 comprises extrusion of elastomer, as distinguished from injection molding of elastomer. Extrusion of the elastomer is performed using an extrusion die and associated capital extrusion equipment in a continuous process. Lengths of material that are used to create shear plates 26, 28 in the finished bushings are run through the extrusion die at suitable process speed as the extrusion die extrudes elastomer onto them. Such a process is believed to provide a more economical method of making bushings 10.

The lengths of material used to create shear plates 26, 28 may themselves be fabricated in any of various ways using any of a number of different materials, including both plastics and metals. It is believed that the use of plastic as the predominant material for shear plates 26, 28 is however especially advantageous because of the ability of certain elastomers, such as natural and synthetic rubbers, to bond well to certain plastics, such as nylon. Whether or not adhesives are used to aid the bonding may depend of particular materials selected for the shear plates and the elastomer. Some materials may bond well directly without the use of adhesive; others may require an adhesive to obtain better bonding.

The lengths of material used to create shear plates 26, 28 may, for example, be fabricated from flat plastic stock that is formed to the arcuate transverse cross section as shown. Two lengths of the formed plastic are arranged substantially diametrically opposite each other and substantially concentric with the central axis, and moved in unison through the extrusion die. The die extrudes elastomeric material in covering relation to the two lengths of plastic material as they move in unison through the die. Both become embedded in the elastomeric material as shown by FIG. 2.

The extrusion die is shaped to create an annular elastomeric body which is substantially concentric with the central axis and within which the lengths of plastic are embedded. When the extrusion arrives at a further point in the extrusion line where the extruded material has sufficiently cured, the extrusion is transversely cut, including cutting through the lengths of plastic material. The cuts are made at locations along the length of the extrusion to create individual bushings 10 having desired lengths. Thereafter the individual bushings may be associated with respective brackets and stabilizer bars in conventional manner for mounting in a vehicle.

A further advantage of extrusion is that an extrusion die is relatively inexpensive compared to an injection molding die. If the size or shape of through-hole 14 needs to be changed, such change may be readily accomplished by a corresponding change in the extrusion die. It is believed that such a change can be made more quickly and less expensively in an extrusion die than in injection mold cavities.

The extrusion process also allows bushings 10 to include voids 30 that run along opposite lengthwise edges of shear plates 26, 28. The incorporation of such a void, or voids, may be done for one or more various reasons including: to provide stress relief along a shear plate edge; to reduce the bushing rate in the fore-aft direction for vehicle turning; to facilitate stretching of the elastomer when the bushing is being assembled onto a stabilizer bar; and to facilitate locating the shear plates in an extrusion die or tool during extrusion.

While a presently preferred embodiment has been illustrated and described, it is to be appreciated that the invention may be practiced in various forms within the scope of the following claims.

What is claimed is:

1. A method of making pivot bushings comprising:
   providing a length of rigid plastic insert material that in transverse cross section has a shape that is arcuate about a central axis and that is capable of functioning as a shear plate;
   moving the insert material lengthwise through an extrusion die;
   at the die, creating an annular elastomeric body which is substantially concentric with the central axis and within which the insert material is embedded by extruding elastomeric material in covering relation to the insert material as the insert material moves through the die and allowing the elastomeric material to cure onto the rigid plastic insert material so that the rigid plastic insert material becomes a shear plate embedded within the elastomeric body;
   and then transversely cutting the annular elastomeric body, including cutting through the insert material, at locations along the length of the insert material, thereby creating individual bushings.

2. A method as set forth in claim 1 including providing a second length of rigid plastic insert material that in transverse cross section has a shape that is arcuate about a central axis;
   arranging the two lengths of insert material substantially diametrically opposite each other and substantially concentric with the central axis;
   moving both lengths of insert material in unison through the extrusion die; and
   extruding elastomeric material in covering relation also to the second length of insert material as the two lengths move in unison through the die and allowing the elastomeric material to cure onto the second length of rigid plastic insert material such that the second length of rigid plastic insert material becomes a second shear plate embedded in the elastomeric material.

3. A method as set forth in claim 2 including creating voids in the elastomeric material running lengthwise along lengthwise edges of the lengths of insert material.

4. A method as set forth in claim 1 including a further step of mounting each severed bushing in a metal bracket that can be fastened to a vehicle.

5. A method as set forth in claim 1 including creating a void in the elastomeric material running lengthwise along one lengthwise edge of the length of insert material.

6. A bushing for mounting a stabilizer bar in association with a suspension system on the undercarriage of a motor vehicle comprising:

an elastomeric body that is annular about a central axis and comprises an inside diameter adapted to receive a portion of the stabilizer bar and an outer perimeter adapted to be received in a bracket for attachment to the undercarriage;

and at least one shear plate of substantially plastic material that in transverse cross section has a shape which is arcuate about the central axis and that is embedded within the elastomeric body.

7. A bushing as set forth in claim 6 in which the bushing comprises two such shear plates arranged substantially diametrically opposite each other and substantially concentric with the central axis.

8. A bushing as set forth in claim 7 including a bracket within which the bushing is received and which provides for attachment to the undercarriage.

9. A bushing as set forth in claim 7 including voids in the elastomeric material running lengthwise along lengthwise edges of the shear plates.

10. A bushing as set forth in claim 6 including a void in the elastomeric material running lengthwise along a lengthwise edge of the at least one shear plate.

11. A suspension system of a motor vehicle comprising:

a stabilizer bar;

a bushing for associating a portion of the stabilizer bar with an undercarriage of the vehicle; and a bracket which is attached to the vehicle undercarriage and within which the bushing is received;

the bushing comprising an elastomeric body that is annular about a central axis and comprises an inside diameter within which the portion of the stabilizer bar is received and an outer perimeter which is received in the bracket, and at least one shear plate of substantially plastic material that in transverse cross section has a shape which is arcuate about the central axis and that is embedded within the elastomeric body.

12. A suspension system as set forth in claim 11 in which the bushing comprises two such shear plates arranged substantially diametrically opposite each other and substantially concentric with the central axis.

13. A suspension system as set forth in claim 12 including voids in the elastomeric material running lengthwise along lengthwise edges of the shear plates.

14. A suspension system as set forth in claim 11 including a void in the elastomeric material running lengthwise along a lengthwise edge of the at least one shear plate.

* * * * *